United States Patent [19]

Lambregts

[11] Patent Number: 4,533,999
[45] Date of Patent: Aug. 6, 1985

[54] AIRCRAFT ROLL STEERING COMMAND SYSTEM

[75] Inventor: Antonius A. Lambregts, Issaquah, Wash.

[73] Assignee: The Boeing Company, Seattle, Wash.

[21] Appl. No.: 294,274

[22] Filed: Aug. 19, 1981

[51] Int. Cl.$^3$ .............................................. G05D 1/12
[52] U.S. Cl. .................................. 364/429; 364/428; 244/183
[58] Field of Search ............... 364/428, 429; 244/175, 244/181, 183

[56] References Cited

U.S. PATENT DOCUMENTS

| | | | |
|---|---|---|---|
| 2,927,751 | 3/1960 | Daspit | 244/184 |
| 3,174,146 | 3/1965 | Bossler et al. | 364/429 |
| 3,355,126 | 11/1967 | Oppedahl | 244/184 |
| 3,573,827 | 4/1971 | De Botton | 244/183 |
| 3,697,022 | 10/1972 | Autechaud et al. | 244/184 |
| 3,989,209 | 11/1976 | Feintuch et al. | 364/429 |
| 4,316,252 | 2/1982 | Cooper | 364/428 |
| 4,354,237 | 10/1982 | Lambregts et al. | 364/428 |

OTHER PUBLICATIONS

Madden et al.; "Nonlinear Trajectory-Following & Control Tech. in Terminal Area Using MLS Navigation Sensor"; Navigation: Jnl. of Inst. of Navigation; vol. 20, No. 4, winter 1973–1974; pp. 285–295.

Minnett et al.; "Interscan—A New Microwave Approach and Landing Guidance System for Int'l Civil Aviation"; AEV (Jnl. of Asia Elect. Union), vol. 7; No. 2, 1974, pp. 15–20.

Primary Examiner—Gary Chin
Attorney, Agent, or Firm—James P. Hamley; Bernard A. Donahue

[57] ABSTRACT

Aircraft roll command signals are generated as a function of the Microwave Landing System based azimuth, groundtrack, groundspeed and azimuth rate or range distance input parameters. On initial approach, roll command signals are inhibited until a minimum roll command requirement is met. As the aircraft approaches the centerline of the runway, the system reverts to a linear track control.

10 Claims, 11 Drawing Figures

Fig. 1A
ILS SYSTEM

Fig. 1B
MLS SYSTEM

AIRCRAFT ROLL STEERING COMMAND SYSTEM

BACKGROUND OF THE INVENTION

The invention described herein was made in the performance of work under a NASA contract No. NAS 1-14880 and is subject to the provisions of Section 305 of the National Aeronautics and Space Act of 1948, Public Law 85-568 (72 Stat. 435; 42 U.S.C. 2457).

The present invention pertains to the aircraft guidance art and, more particularly, to a Microwave Landing System responsive roll command system.

Aircraft approaching landing sites are often provided with several guidance signals. For example, the well-known Instrument Landing System provides localizer and glideslope signals which indicate to the approaching aircraft deviations from a desired landing approach flight path. Also, Distance Measuring Equipment is provided which allows the aircraft to determine its range with respect to the end of the runway.

Figures 1A, 1B:
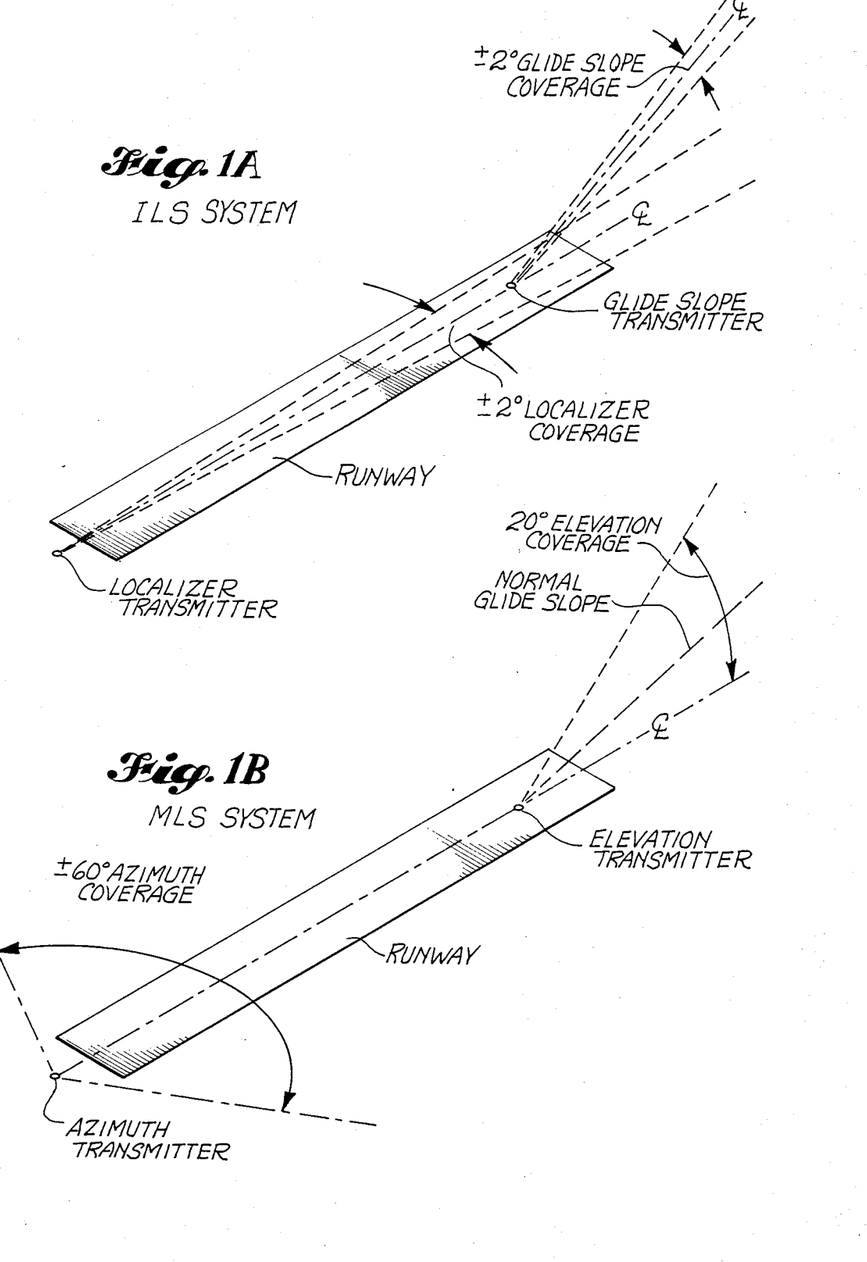
FIGS. 1A and 1B illustrate the coverage provided by the ILS and MLS guidance system, respectively.

Recently, a Microwave Landing System (MLS) has been adopted. By the use of a scanning microwave beam, the MLS system provides wide coverage guidance for aircraft automatic approach and landing control systems. Thus, as illustrated in FIG. 1, whereas the existing ILS guidance system provides linear guidance coverage of only ±2° from the glideslope and localizer centerline, the MLS provides guidance up to ±60° azimuth from the extended runway centerline and up to 20° in elevation. The extended volumetric coverage and high accuracy of the MLS system allows precision aircraft guidance in the landing site area for:

(a) a wide range of initial approach headings intercepting the extended runway centerline;
(b) short final approaches; and
(c) complex approach paths to avoid obstacles and/or for noise abatement.

Figure 2:
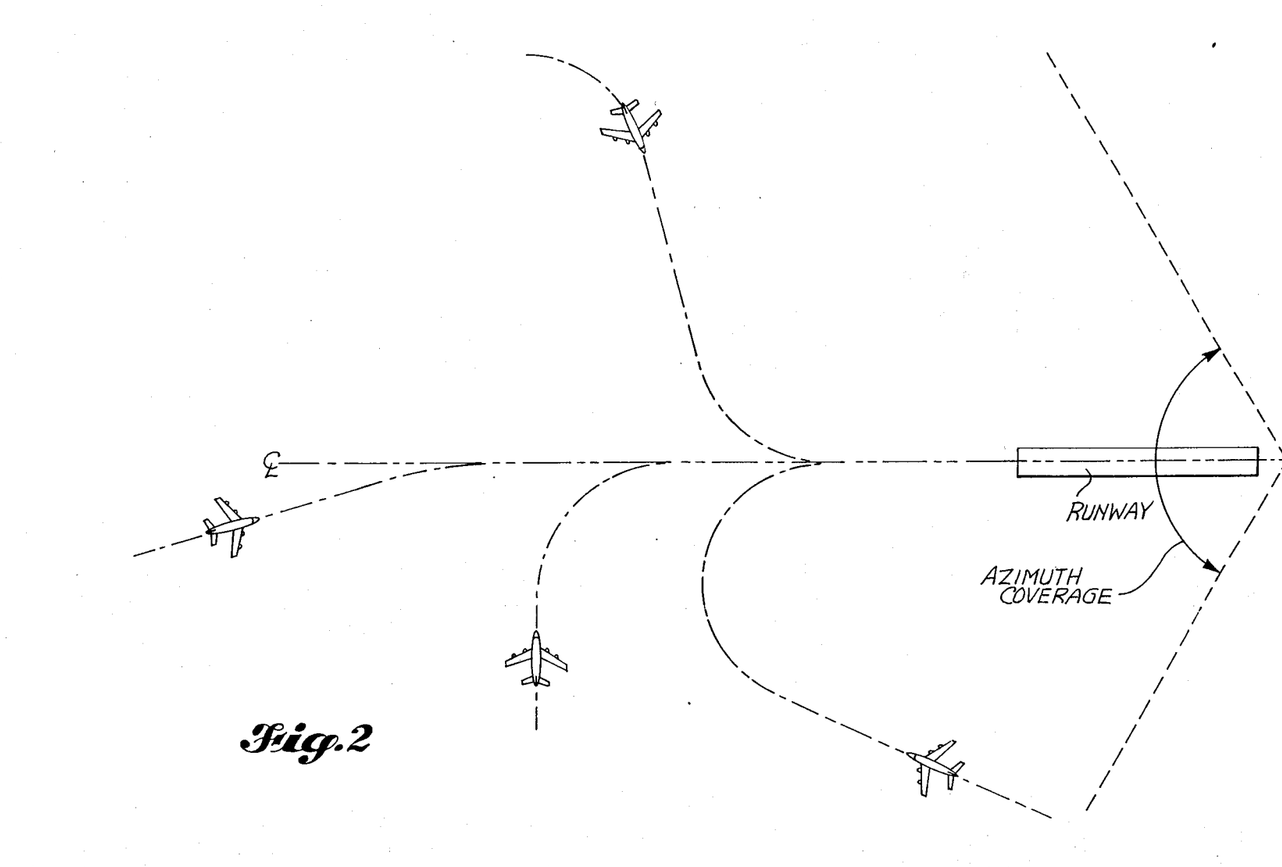
FIG. 2 illustrates various aircraft approach paths made possible by the MLS.

FIG. 2 illustrates examples of such approach paths.

Present autoland control systems have been designed to capture and track the straight ILS localizer and glideslope centerlines, starting from a relatively shallow intercept angle and a small centerline offset. They do not provide, however, for the use of received MLS signals directly to capture and track the extended runway centerline from an initial position with a large azimuth and runway intercept angle. Thus, to fly a desired approach path, the MLS azimuth, elevation and range (as from Distance Measuring Equipment) must first be converted to aircraft position information in an orthogonal coordinate system that has been defined with precise references to the runway on which the aircraft will land. Further, the desired approach path must be defined in this coordinate system and programmed into the aircraft's onboard guidance computer. The actual aircraft position must then be compared with the desired approach path and aircraft position errors and velocity converted into steering signals (cross track error and cross velocity) which can be used by the present day autoland control systems. Also, MLS reference data, specific for each runway and MLS system, must be entered into the guidance computer to allow the complex navigation/guidance computations to be performed.

Although this technology has been demonstrated in flight and will find application in sophisticated air carrier operations, a simpler, more flexible MLS guidance and control system is desired which can provide automatic capture capability of the extended runway centerline for a wide range of initial approach intercept angles and positions without the need to manually program the approach path, enter MLS/runway data or execute complex navigation/guidance computations.

SUMMARY OF THE INVENTION

It is an oject of this invention, therefore, to provide an aircraft autoland control system which simply and accurately processes MLS guidance signals to provide aircraft landing approach control.

It is a particular object of the invention to provide aircraft roll steering command signals for use to capture and track the extended runway centerline for a wide variety of initial approach conditions.

Briefly, according to the invention, apparatus provides a roll steering command signal $\phi_c$ to an aircraft on approach to the runway of a landing site wherein the landing site provides a Microwave Landing System (MLS) guidance signal. The apparatus includes a means which provides a signal $V_G$ representative of the groundspeed of the aircraft. Also provided is a signal $\psi_G$ which is representative of the groundtrack angle of the aircraft with respect to the centerline of the runway. Means provides a signal g representative of the acceleration due to gravity. Further means provides a signal D representative of the range of the aircraft from the source of the MLS guidance signal. A signal $\eta$ is provided which is representative of the azimuth angle of the aircraft relative to the extended runway centerline. Processing means processes the $V_G$, $\psi_G$, D and $\eta$ signals to thereby produce the roll steering signal $\phi_c$. The $\phi_c$ signal is provided to the aircraft for continuously controlling the aircraft to a constant radius turn for following a circular capture path toward the runway centerline.

Alternatively, by generating the first time differential $\dot{\eta}$ of the azimuth angle, a roll command signal can be generated without the need for the range signal D.

DETAILED DESCRIPTION OF THE PREFERRED EMBODIMENTS OF THE INVENTION

FIG. 1A depicts the glideslope and localizer coverage provided by the conventional instrument landing system (ILS). As shown, guidance coverage of only ±2° from the glideslope and localizer centerline is available.

FIG. 1B illustrates the coverage provided by the Microwave Landing System (MLS) wherein, as shown, guidance up to ±60° azimuth from the extended runway centerline and up to 20° in elevation is provided.

FIG. 2 illustrates various types of approach paths made possible by incorporating the MLS signal in an aircraft autoland flight control system.

As is discussed more fully hereinbelow, a particular feature of the present invention is that it is capable of generating roll steering commands based upon MLS azimuth and other signals to bring the aircraft in a position to track the extended runway centerline to landing.

Figure 3:
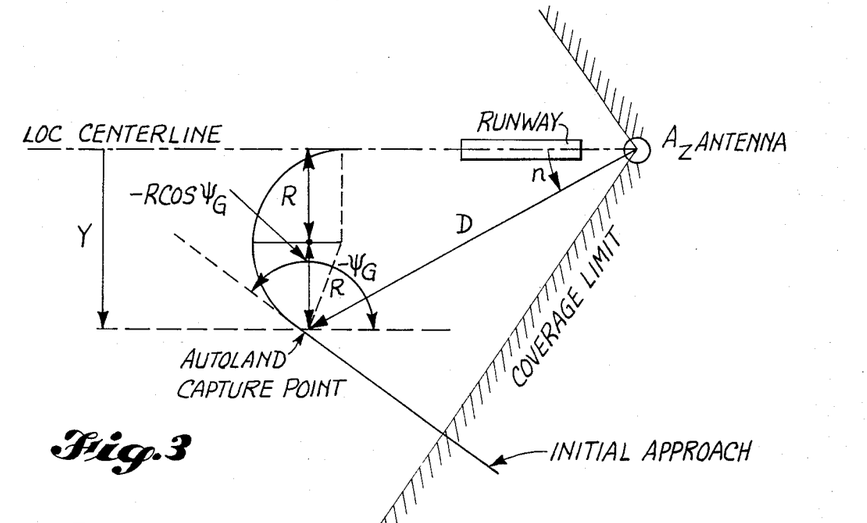
FIG. 3 depicts the approach geometry for an aircraft constant bank angle maneuver.

FIG. 3 depicts the general situation of an aircraft entering the MLS coverage zone of a runway on which the aircraft is to land. The desired procedure is for the aircraft to proceed on the initial approach path, assuming that it intersects the extended runway centerline at a satisfactory distance from the runway, and then make a constant bank angle turn onto the extended runway centerline.

If, for a given condition of azimuth angle $\eta$, groundtrack with respect to the runway centerline $\psi_G$, range from the azimuth transmitter D and groundspeed $V_G$, the required bank angle to fly a constant bank turn onto the extended centerline can be expressed as a function of these variables, then this required bank angle may be computed repeatedly and used to steer the aircraft to execute the circular capture maneuver.

For a given aircraft condition, the required bank angle $\phi$ may be computed as follows. The cross centerline distance Y is given by $$Y = R(1 - \cos \psi_G), \tag{1}$$

where R is the turning radius. Also, $$Y = D \sin \eta, \tag{2}$$

where D is the distance from the azimuth transmitter, $\eta$ is the azimuth angle. Therefore, $$R = \frac{D \sin \eta}{1 - \cos \psi_G} \tag{3}$$

and $$\tan \phi = V_G^2 / Rg, \tag{4}$$

where g is the acceleration due to gravity. Substitution of (3) into (4) yields $$\tan \phi = V_G^2 \frac{(1 - \cos \psi_G)}{g D \sin \eta} \tag{5}$$

The required bank angle to fly from a given position to the centerline without overshoot/undershoot is thus $$\phi_{REQ} = \text{Arc Tan} \frac{V_G^2 (1 - \cos \psi_G)}{g D \sin \eta}, \tag{6}$$

for intercept angles up to 180°.

Figure 4:
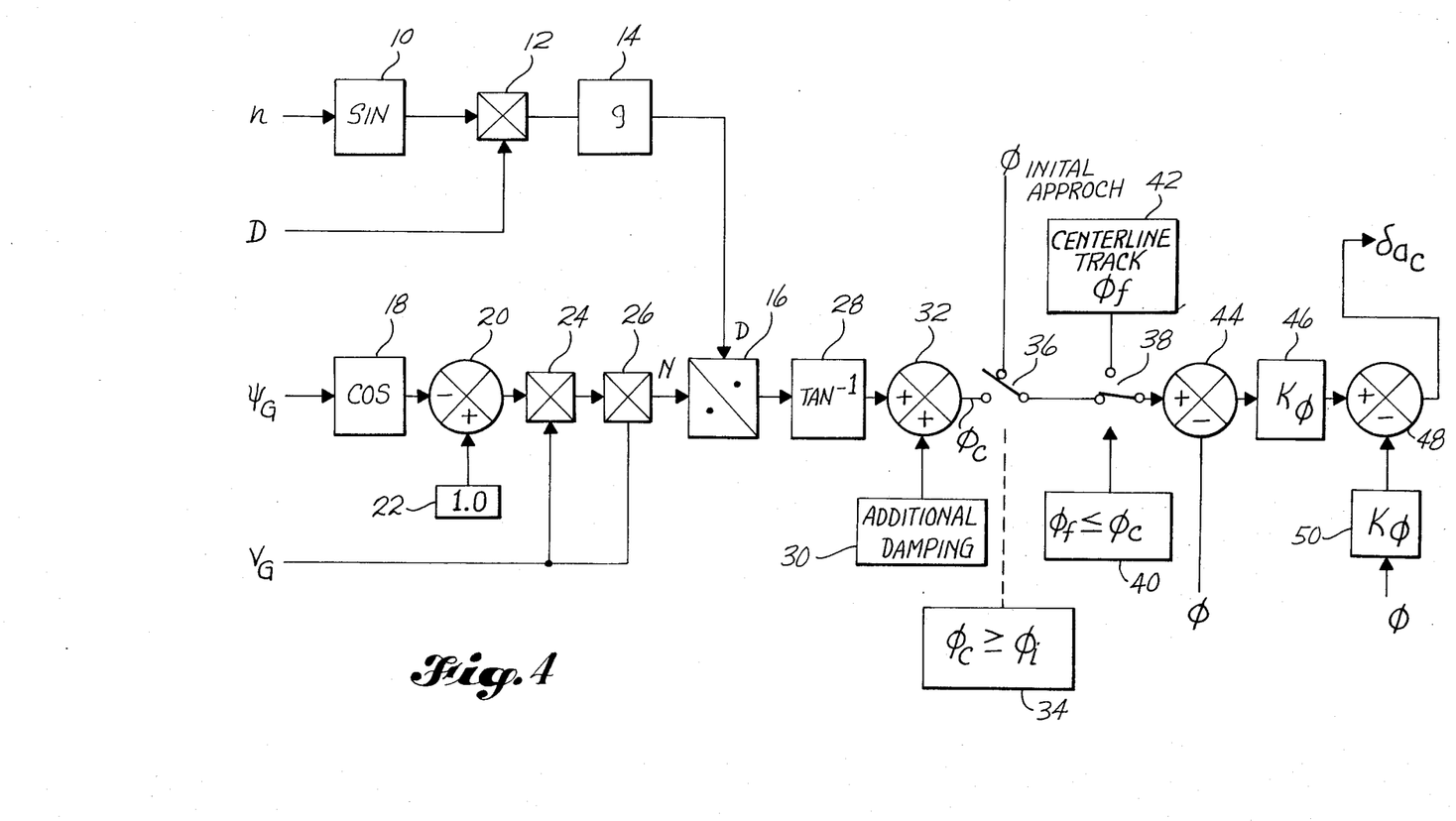
FIG. 4 is a block diagram depicting one embodiment of the roll steering command apparatus.

FIG. 4 is a block diagram of apparatus suitable for providing an aircraft autoland signal using both MLS and ILS guidance signals. The input signals to the system are a signal $\eta$, representative of the azimuth angle of the aircraft with respect to the MLS transmitter, a signal D which is the distance of the aircraft from the azimuth transmitter, a signal $\psi_G$ representative of the groundtrack angle with respect to the runway centerline and a signal $V_G$, representative of aircraft groundspeed. These signals are all provided in the normal manner by conventional aircraft processing circuitry which, for reason of conciseness is not shown herein.

The signal $\eta$ is passed to block 10 which operates to produce an output signal equal to the sine of the input signal. Thus, the output from block 10 is a signal of the form $\sin \eta$ which is multiplied, in multiplier 12, with the signal D. The output from multiplier 12 is multiplied by a factor g in block 14, whereby the output from block 14 is a signal $g D \sin \eta$. This signal is applied at the denominator input of a divider circuit 16.

The signal $\psi_G$ is passed to a block 18 which takes the cosine of signals appearing in its input. The output from block 18 is applied to the subtracting input of summing circuit 20, which receives at its additional input the output from block 22, a signal level of 1.0. Thus, the output from summer 20 is a signal of the form $1 - \cos \psi_G$. This signal gets multiplied by $V_G^2$ via multiplier blocks 24, 26 thereby being supplied to the numerator input of divider 16.

The output from divider block 16 is applied to the input of block 28 which operates on input signals to produce an output signal proportional to the arctangent thereof. Thus, it is seen that the output from block 28 is a signal $$\text{Arc Tan} \frac{V_G^2 (1 - \cos \psi_G)}{g D \sin \eta},$$

for intercept angles up to 180°.

This signal is seen to be identical to the $\phi_{REQ}$ of equation (6). Conventional damping terms via block 30 are added to the signal via summer 32 with the result being that the signal $\phi_c$ at the output of summer 32 is precisely the desired command signal which may be used as a roll steering command for guiding an aircraft on a bank maneuver to effect a circular capture of the extended runway centerline.

When the aircraft first enters the MLS coverage zone, the distance to the runway centerline maybe large and the required bank angle small. It is desirable, therefore, to continue the initial approach until the commanded bank angle $\phi_c$ required for a constant bank turn onto the runway centerline reaches a predetermined initial value $\phi_i$, such as 15 or 20 degrees. Thus, a block 34 compares the commanded roll steering angle $\phi_c$ with the predetermined initial value $\phi_i$. Upon the command angle $\phi_c$ equalling the requisite initial value $\phi_i$, block 34 activates a switch 36 which causes the $\phi_c$ signal to be selected. Otherwise, the signal selected by switch 36 is simply a bank command angle $\phi$ ititial approach generated by the initial approach control system, e.g. track hold.

The output from switch 36 passes through a second switch 38. The aircraft is controlled by the $\phi_c$ signal until such time as $\eta$ becomes small whereby the command computation according to equation (6) becomes unreliable. Therefore, a block 40 compares the command steering angle $\phi_c$ with the signal $\phi_f$ provided by centerline track control block 42. The signal $\phi_f$ provided by block 42 is a conventional linear guidance signal as used in conjunction with the ILS guidance system. The control equation for such a linear track command system is of the form $$\phi_f = K_y Y + K_{\dot{y}} \dot{Y},$$

where Y equals D sin $\eta$, $\dot{Y}$ equals $V_G \sin \psi_G$ and $K_y$ and $K_{\dot{y}}$ are predetermined constants. When the $\phi_f$ signal is less than or equal to the $\phi_c$ signal, this indicates that the aircraft is close to and in-line with the centerline, thus indicating the time to roll the wings level and begin tracking the runway centerline.

The selected signal out of switch 38 is passed to the adding input of a summer circuit 44. Coupled to the subtracting input of summer 44 is a signal $\phi$ representative of actual roll attitude of the aircraft.

The output from summer 44, representative of the roll attitude error, is multiplied by a gain constant $K_\phi$ in block 46. Thereafter the signal is passed to the adding input of a summer 48, with the subtracting input of summer 48 being supplied by a gain block 50, whose input is a signal $\dot{\phi}$. This signal provides roll control damping. Finally, the output from the summer 48 is a signal $\delta_{ac}$ which may be applied to the control surfaces of the aircraft to automatically control the roll and capture maneuver.

The centerline capture angle steering command as developed by the circuit of FIG. 4 was evaluated using a 737 aircraft simulation with the existing autopilot inner loop ($\phi$ and $\dot{\phi}$ feedbacks). A gain factor was included in equation (6) to compensate for the lag between the commanded and the actual bank angle, with the control law being engaged when $\phi_c$ reached 19° with a capture bank angle target of 20°.

Figure 5:
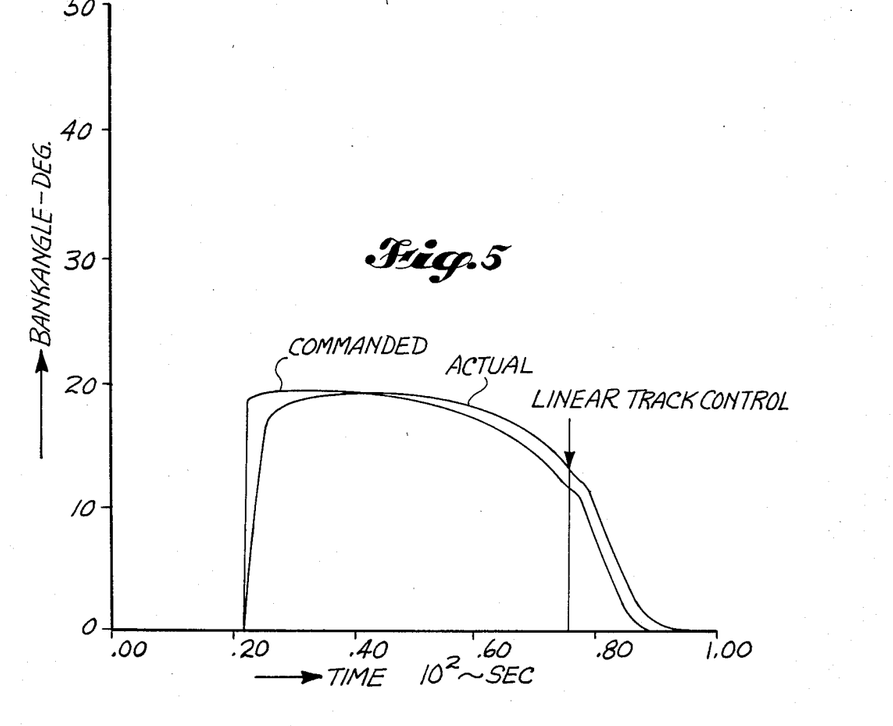
FIG. 5 is a graph illustrating the type of roll steering command signal generated by the system of FIG. 4.

FIG. 5 shows the resulting time history of the commanded and actual bank angles, starting from an initial condition of $\eta = 50°$, $\psi_0 = 150°$ and $D_0 = 14{,}000$ feet.

Figure 6:
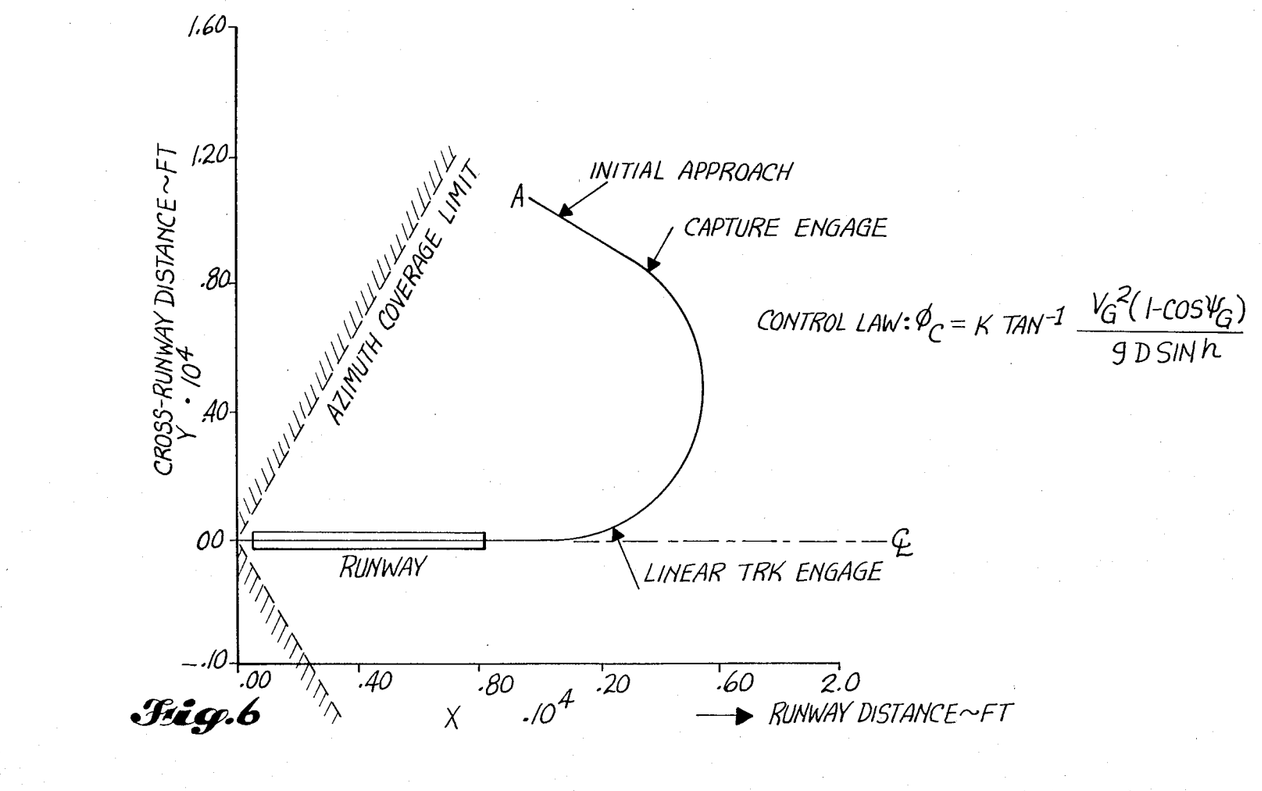
FIG. 6 shows the groundtrack, in X and Y coordinates, of an aircraft following the roll steering command signal of FIG. 5.

FIG. 6 shows the plot of cross runway distance in feet versus runway distance in feet, illustrating the groundtrack in X, Y coordinates relative to the runway and azimuth transmitter corresponding to the time history of FIG. 5.

The points identified as "linear track engage" in FIGS. 5 and 6 refer to that point in time when the system reverts to the linear track guidance commands.

Elimination of the Requirements for DME Distance

The capture steering command according to equation (6) requires $\eta$, DME distance, ground speed and track intercept angle. If a usable $\dot{\eta}$ signal can be derived, where $\dot{\eta}$ is the first time derivative of azimuth angle $\eta$, the DME distance may be eliminated from the equation as follows:

$$\dot{Y} = V_G \sin \psi_G,$$

where $\dot{Y}$ is cross track velocity. Therefore, $$V_G = \dot{Y}/\sin \psi_G \qquad (7)$$

Also, $$\dot{Y} = D(\cos \eta)\dot{\eta} + \dot{D} \sin \eta \approx D(\cos \eta)\dot{\eta}, \qquad (8)$$

Since $D(\cos \eta)\dot{\eta} >> \dot{D} \sin \eta$ for all practical cases. Substituting (8) into (7) yields $$V_G = \frac{D(\cos \eta)\dot{\eta}}{\sin \psi_G} \qquad (9)$$

Substitution of (9) into (5) yields $$\text{Tan } \phi = \frac{V_G}{g} \frac{\dot{\eta}}{\text{Tan } \eta} \frac{(1 - \cos \psi_G)}{\sin \psi_G}. \qquad (10)$$

For $\psi < 90°$, the function $$\frac{1 - \cos \psi_G}{\sin \psi_G}$$

can be approximated by 0.0088 $\psi_G$. With this approximation, equation (10) becomes $$\text{Tan } \phi = .0088 \frac{V_G}{g} \frac{\dot{\eta}}{\tan \eta} \psi_G \qquad (11)$$

(with $\psi_G$ in degrees, $\dot{\eta}$ in rad/sec). Thus, since for $\phi < 30°$, $\tan \phi \approx \phi$, $$\phi_c \approx .0088 \frac{V_G}{g} \frac{\dot{\eta}}{\tan \eta} \psi_G \qquad (12)$$

For $\psi_G > 90°$ equation (11) underestimates the required bank angle. However, when used as a bank angle steering command, automatic correction will take place as the airplane approaches the centerline and $\psi_G$ is reduced.

Equation (11) may be simplified further, considering that the actual capture maneuver is executed when $\eta < 30°$. Tan $\eta$ may therefore be approximately by $\eta$. Therefore, $$\phi_c = .0088 \frac{V_G}{g} \frac{\dot{\eta}}{\eta} \psi_G \qquad (13)$$

($\phi_c$ in radians) or $$\phi_c = .50 \frac{V_G}{g} \frac{\dot{\eta}}{\eta} \psi_G \qquad (14)$$

($\phi_c$ and $\psi_G$ in degrees).

Figure 7:
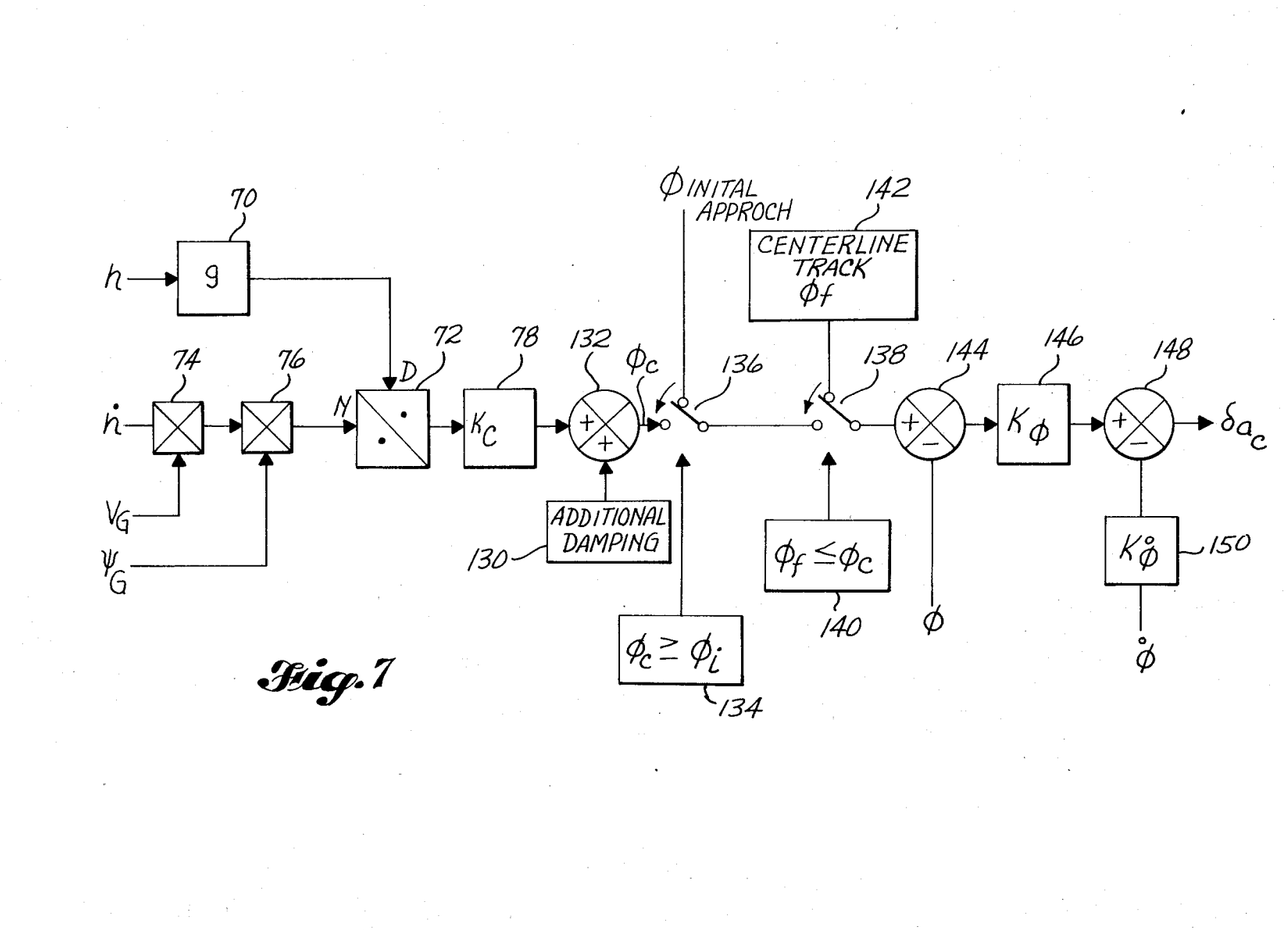
FIG. 7 is a block diagram illustrating an alternate embodiment of the roll steering command system.

FIG. 7 is a block diagram illustrating apparatus for generating the roll steering and command signal $\phi_c$ in accordance with equation (11). Thus, as before with respect to FIG. 4 various signals are supplied by the associated aircraft electronics including the azimuth angle $\eta$, groundspeed signal $V_G$ and groundtrack angle signal $\psi_G$. Instead of the requirement for a range signal D, however, this embodiment uses a signal $\dot{\eta}$, which signal is related to the first time derivative of the azimuth angle $\eta$. Circuitry for producing all of the signals $\eta$, $\dot{\eta}$, $V_G$ and $\psi_G$ is very well known in this art, and, as such will not be disclosed herein.

The azimuth angle signal $\eta$ is multiplied by a factor g representative of the acceleration due to gravity, via gain block 70. The resulting signal is coupled to the denominator input of a divider block 72.

The azimuth rate signal $\dot{\eta}$ is first multiplied by groundspeed $V_G$ in multiplier 74, with that product being multiplied by the groundtrack angle signal $\psi_G$ in multiplier 76. The resulting output from multiplier 76 is passed to the numerator input of divider block 72.

The output from divider block 72 is, therefore, $$\frac{\dot{\eta} V_G \psi_G}{\eta g}$$

This signal is then multiplied by a fixed constant $K_C$ in block 78 producing an output roll steering command signal $\phi_c$ in accordance with either of equations (13) or (14) depending upon the selection of the constant $K_C$.

The remaining circuitry of FIG. 7 performs identically to its counterparts shown in FIG. 4 and, as such, will not be described in detail.

Figure 8:
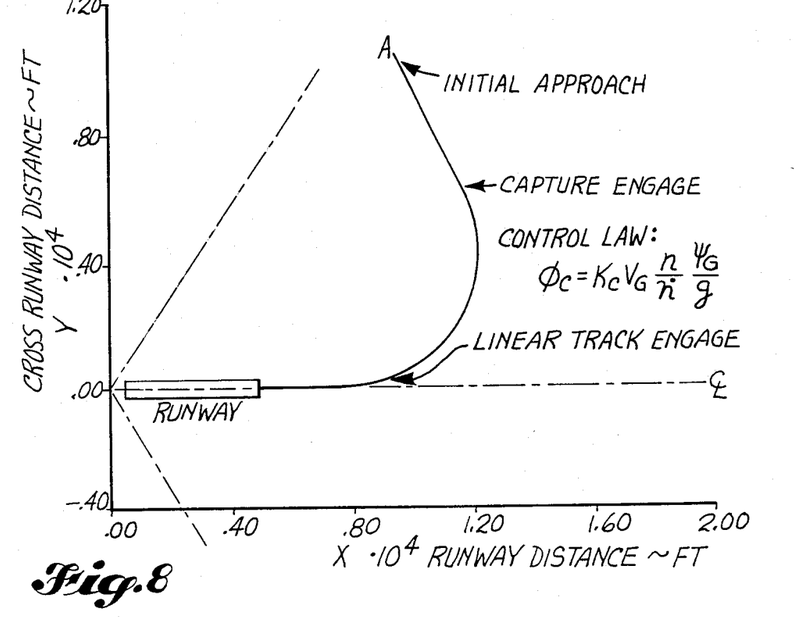
FIG. 8 depicts an example of an aircraft groundtrack, in X and Y coordinates, following the command signals generated by the system of FIG. 7.

FIG. 8 is an X, Y plot of cross runway distance versus runway distance wherein a simulated 737 aircraft was flown in accordance with the apparatus of FIG. 7. Here, $\psi_0 = 120°$ and the engage point was selected at $\phi_i = 17°$.

Figure 9A:
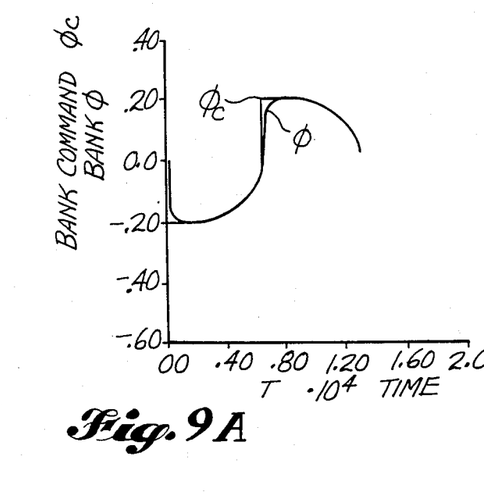
FIGS. 9A and 9B illustrate the command signal, and the resulting X, Y coordinate groundtrack, respectively, of an S-turn type control provided by the present invention.
Figure 9B:
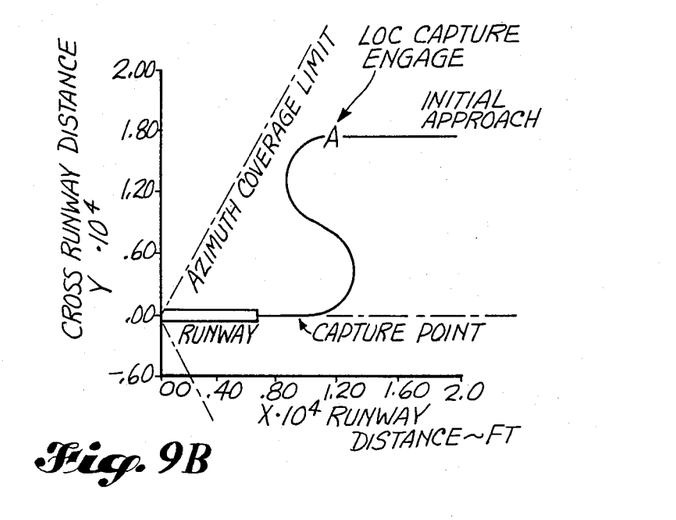

The control laws, and corresponding apparatus discussed above may be readily modified to allow circular capture of straight track segments other than the runway centerline. For example, FIGS. 9A and 9B illustrate the bank command $\phi_c$ time history and S-shaped approach path executed by the aircraft to capture the runway centerline from an initial approach track that is parallel to the runway. Such an approach has particular utility in areas wherein objects near the runway make an otherwise straightforward approach difficult or wherein a more common approach path results in excessive ground noise to residents under the path.

It will be understood that many other approach path realizations are possible through implementation of the present invention.

In summary, an aircraft autoland guidance system has been disclosed which utilizes the MLS guidance signals to provide a roll steering command to an aircraft to capture the extended runway centerline. The present system is precise in operation and yet does not require incorporation of complicated computing systems.

Whereas preferred embodiments of the invention have been described in detail, it should be apparent that many modifications and variations thereto are possible, all of which fall within the true spirit and scope of the invention.

I claim:

1. Apparatus for providing a roll steering signal $\phi_c$ to an aircraft on approach to the runway of a landing site wherein said landing site provides a Microwave Landing System (MLS) guidance signal, the apparatus comprising:
   means for providing a signal $V_G$ representative of the groundspeed of the aircraft;
   means for providing a signal $\psi_G$ representative of the groundtrack angle of the aircraft with respect to the centerline of the runway;
   means for providing a signal g representative of the acceleration due to gravity;
   means for providing a signal D representative of the range of the aircraft from the source of the MLS guidance signal;
   means for providing a signal $\eta$ representative of the azimuth angle of the aircraft from the source of the MLS guidance signal; and
   processing means for predeterminedly processing said $V_G$, $\psi_G$, D and $\eta$ signals to produce said roll steering command signal $\phi_c$, said signal $\phi_c$ being provided to said aircraft for continuously controlling said aircraft to a constant radius turn for following a circular capture path toward the runway centerline.

2. The apparatus of claim 1 wherein the processing means comprises means for generating said roll steering command signal $\phi_c$ in accordance with the relationship:

$$\phi_c = \text{Arc Tan} \frac{V_G^2(1 - \cos \psi_G)}{g D \sin \eta}$$

3. The apparatus of either of claims 1 or 2 including:
   means for comparing said roll steering command signal $\phi_c$ to an initial, minimum reference command signal $\phi_i$ and inhibiting said $\phi_c$ signal from being provided to the aircraft for the control thereof in response to the condition of $\phi_c < \phi_i$.

4. The apparatus of either of claims 1 or 2 including:
   means for providing a final roll steering command signal $\phi_f$ to track the extended runway centerline; and
   means for providing said $\phi_f$ signal to the aircraft for the control thereof in response to the condition $\phi_f \leq \phi_c$.

5. The apparatus of claim 3 including:
   means for providing a final roll steering command signal $\phi_f$ to track the extended runway centerline; and
   means for providing said $\phi_f$ signal to the aircraft for the control thereof in response to the condition $\phi_f \leq \phi_c$.

6. Apparatus for providing a roll steering command signal $\phi_c$ to an aircraft on approach to the runway of a landing site wherein the landing site provides a Microwave Landing System (MLS) guidance signal, the apparatus comprising:
   means for providing a signal $V_G$ representative of the groundspeed of the aircraft;
   means for providing a signal $\eta$ representative of the azimuth angle of the aircraft with respect to the centerline of the runway;
   means for providing a signal $\psi_G$ representative of the groundtrack angle of the aircraft with respect to the centerline of the runway;
   means for providing a signal g representative of the acceleration due to gravity; and
   processing means for predeterminedly processing said $V_G$, $\eta$, $\psi_G$ and g signals to produce said roll steering command signal $\phi_c$, said signal $\phi_c$ being provided to said aircraft for continously controlling said aircraft to a constant radius turn for following a circular capture path toward the runway centerline.

7. The apparatus of claim 6 wherein the processing means comprises means for generating said roll steering command signal $\phi_c$ in accordance with the relationship:

$$\phi_c = K \frac{V_G}{g} \frac{\dot{\eta}}{\eta} \psi_G,$$

where K is a predetermined constant and $\dot{\eta}$ is the first time derivative of $\eta$.

8. The apparatus of either claims 6 or 7 including:
means for comparing said roll steering command signal $\phi_c$ to an initial, minimum reference command signal $\phi_i$ and inhibiting said $\phi_c$ signal from being provided to the aircraft for the control thereof in response to the condition $\phi_c \leq \phi_i$.

9. The apparatus of either of claims 6 or 7 including:
means for providing final roll steering command signal $\phi_f$; and
means for providing said $\phi_f$ signal to the aircraft for the control thereof in response to the condition $\phi_f \leq \phi_c$.

10. The apparatus of claim 8 including:
means for providing final roll steering command signal $\phi_f$; and
means for providing said $\phi_f$ signal to the aircraft for the control thereof instead of said $\phi_c$ signal in response to the condition of $\phi_f \leq \phi_c$.

* * * * *